Aug. 20, 1957    G. BRADFIELD    2,803,129
APPARATUS FOR TESTING OF ELASTIC MATERIALS
Filed May 27, 1952    2 Sheets-Sheet 1

INVENTOR
Geoffrey Bradfield
BY G. F. Odell
ATTORNEY

INVENTOR
Geoffrey Bradfield
BY
ATTORNEY

United States Patent Office 2,803,129
Patented Aug. 20, 1957

2,803,129
APPARATUS FOR TESTING OF ELASTIC MATERIALS

Geoffrey Bradfield, Teddington, England, assignor to Council for Scientific and Industrial Research, London, England, a corporation of Great Britain and Northern Ireland Application May 27, 1952, Serial No. 295,109

Claims priority, application Great Britain May 28, 1951

11 Claims. (Cl. 73—67.8)

This invention relates to the testing of elastic materials such as metals, for internal flaws and apparatus for use in practising the method.

The invention makes use of the piezo-electric properties of barium titanate. In this specification by the term "barium titanate" is to be understood the pure material, or the material itself with an admixture of a binder, or the material itself with the admixture of a binder and of a material such as lead titanate which increases the ability of the barium titanate when polarised to withstand on the one hand depolarising fields and, on the other, mechanical vibration.

This material is incorporated in a transducer head and is used both to transmit mechanical energy to the specimen and to pick up the mechanical energy reflected by the specimen.

Transducers in which one and the same piezo-electric crystal of quartz is used for transmitting mechanical energy to and receiving it from a specimen have been proposed, but barium titanate affords special advantages. The impedance can be much more nearly matched to that of the specimen e. g. steel, thus much improving the transmission in both directions. Again while bridge circuits were proposed to be used with the prior combined heads in order to avoid paralysing the amplifier during the transmission of energy to the specimen, barium titanate owing to its physical constants enables a particularly advantageous bridge circuit, which will be described below, to be used. It further enables the quality of the contact for mechanical wave transfer between the transducer head and the specimen to be indicated, which in turn enables the size as well as the position of a detected flaw to be estimated.

Figure 1:
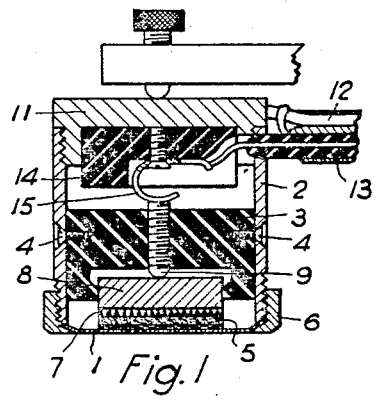
Figure 2:
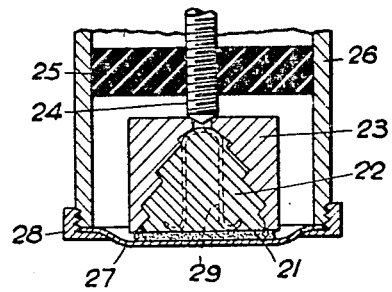
Figure 3:
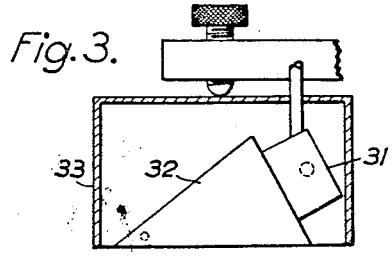
Figure 1A:
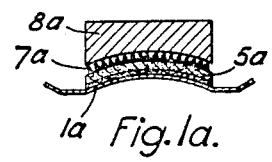
Figure 4:
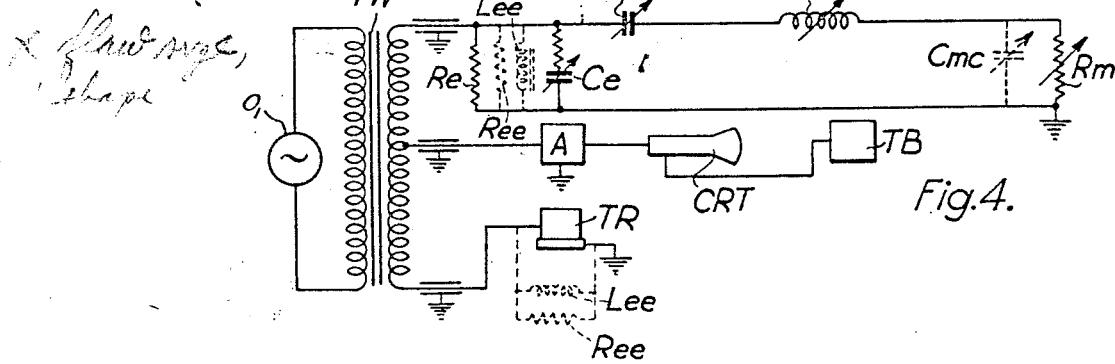
Figure 5:
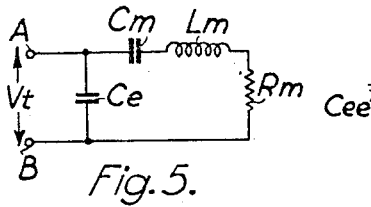
Figure 6:
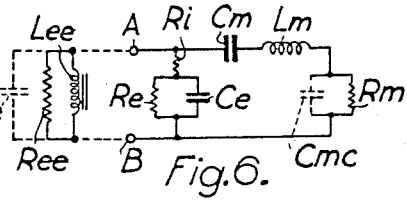
Figure 7:
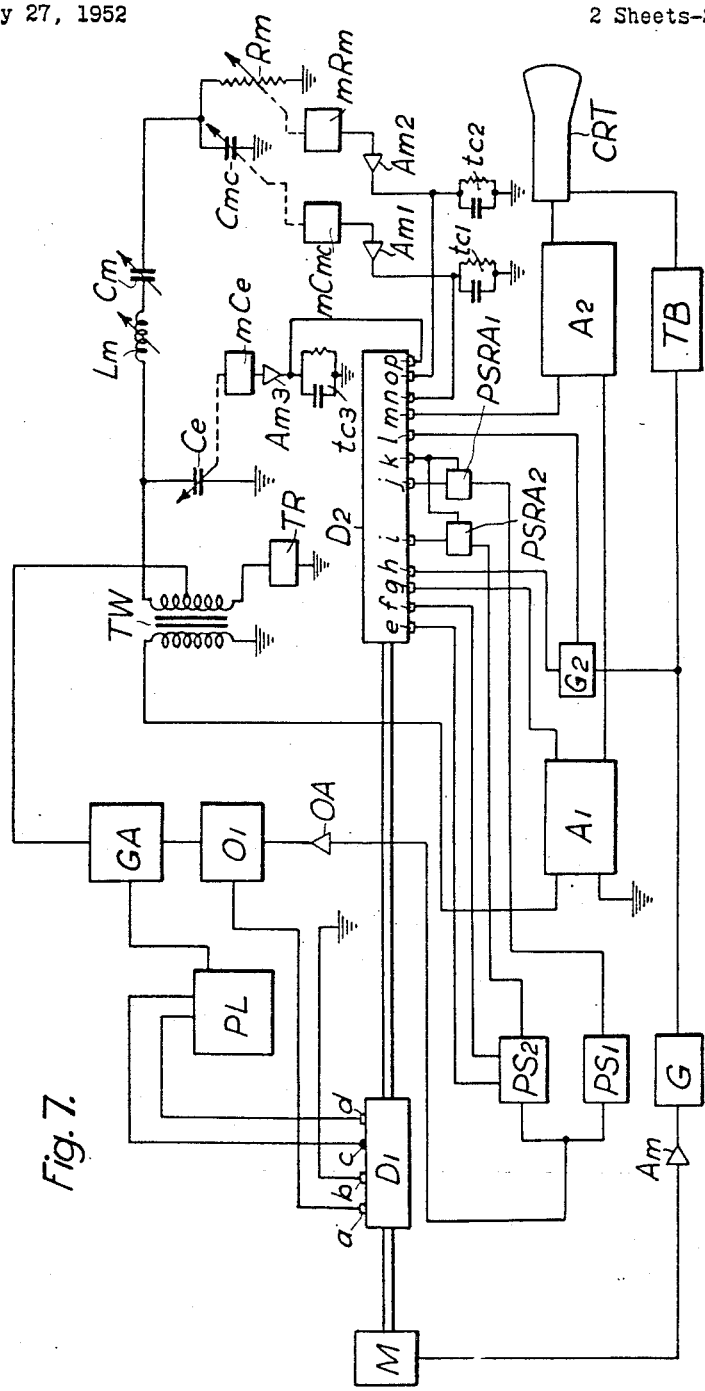

The invention will be further described with reference to the accompanying drawings in which Figure 1 is a cross-section of a construction of transducer head according to the invention, Figure 1a is a cross section of a modification of Fig. 1, Figure 2 is a cross-section of another construction of transducer head according to the invention, Figure 3 is a diagrammatic view showing the arrangement of the head with a device for changing the mode of vibration in the specimen, Figure 4 is a circuit diagram showing a bridge circuit according to the invention, Figures 5 and 6 are circuit diagram serving to explain how the quality of contact between the transducer and specimen can be evaluated, Figure 7 is a diagram showing a scheme for automatic balancing of the bridge.

Referring now to Figure 1, the head incorporates a thin metal diaphragm 1 which protects the piezo-electric element and enables it to be pressed firmly on the specimen through the diaphragm without introducing spurious responses due to echoes in the housing itself. As compared for instance with known quartz-crystal flaw detectors, the present head enables a much longer and more flexible cable to be used. The head comprises a tubular housing 2, say of steel, carrying about midway of its length an insulating bridge 3 secured say by screws 4 through the housing. The lower end is closed by the diaphragm 1 of thin high carbon steel which may be soldered to the housing or held by a screwed-on clamping ring 6. For actuation at 2½ mc./sec. the thickness of the diaphragm may be 0.002 inch, while for 5 mc./sec. it may be 0.001 inch or a little more. The thickness would be proportionately greater for 1 mc./sec. and ½ mc./sec. To the upper face of the diaphragm 1 is secured by a cement, a disc form element 5 of barium titanate having a fired on preferably double silver coating. The annulus of the diaphragm surrounding the disc may be coated with a damping material. Contact to the back of the disc is made by a multiplicity of thin spikes terminating in points indicated at 7 held by a metal backing 8 "hair brush" fashion. An inner pressure screw 9 extends through the insulating bridge 3 and bears against the back 8 of the "hair brush." The upper end of the housing is closed say by a brass disc 11 having an arm 12 projecting to one side to serve as a support to which the flexible coaxial cable 13 is bound. On the under face of the brass disc is an insulating disc 14 carrying a C-shaped contact spring 15 to one end of which the inner conductor of the cable is connected and the other end of which bears against the above-mentioned inner pressure screw 9. A convenient size of head for 2½ mc./sec. uses a titanate disc 1 mm. thick and 20 mm. diameter, while the diameter of the housing may be say 1¼ inches. When applied to the specimen an outer pressure screw carried by a rigid arm bears axially against the upper face of the brass disc 11. When the bridge circuit as described below is used the pressure arm ensures steady contact while the bridge is being balanced. Experience has shown that when a transducer is oiled and placed on a seating, the quality of contact even under steady pressure changes during a brief time and then stabilizes. This stable value can then be tested in order to give the flaw return index, i. e. the ratio of the effective mechanical field picked up and transformed by the electrical properties of the crystal to applied wave field at the flaw due to the transformation by the crystal of the electrical input to it.

Great care must be taken in mounting the crystal. This may be done by coating one side, over the silver coating, with polyvinyl acetate cement, baking at 190° C. for 1 hour, and similarly coating the diaphragm. The two are then put together under a very uniformly applied pressure which for the above diameter may be 1 to 2 cwt., and heated for 1 hour at 190° C. Subsequently the "hair brush" backing may be cemented with epoxy resin varnish to the element under high pressure.

Owing to the fact that barium titanate in polycrystalline form can readily be shaped to a non-planar surface and can then be polarised to have its polar axis normal to such a surface, the type of device shown in Figure 1 can be modified for instance as shown in Figure 1a to use a barium titanate disc 5a of slightly cylindrical under surface cemented on to a curved diaphragm 1a and backed by a curved "hair brush" 7a, 8a. In this way the device can fit better on to the curved surface of rounded specimens.

It has been found that improved results can be obtained by backing the barium titanate in such a way that additional loading occurs. A single block of dense damping material might be secured to the back of the element, but Figure 2 illustrates a preferred way of carrying out this loading. The element itself is at 21 and is backed by a loading material 22 which is preferably held by a stiff or heavy outer jacket 23 on to which pressure can be applied in the usual way by screw 24 in insulating bridge 25 fixed as usual to the housing 26 at whose lower end the diaphragm 27 (to which the crystal 21 is cemented) is held by the retaining ring 28.

It is preferred that the material 22 should have a density between say 1.2 and 6 and it must adhere firmly to the back of the crystal without air film either by direct adhesion or by a cement or by a thin oil or grease film etc. A material found suitable for 22 is polyvinyl chloride which may have its density and damping effect increased by incorporating powdered tungsten. It is preferred that the inner surface of the outer container 23 for 22 should be serrated or stepped in form somewhat as shown (the preferred angle being 48° to the axis) to produce the maximum length of reflected path for energy before it is returned to hit the crystal 21. In this way little confusion of the trace occurs due to such unwanted signals. Inlet and outlet holes may be provided in jacket 23 so that the loading material 22 may be injection moulded directly against the crystal 21. A spring 29 may also be provided to make contact between the rear face of crystal 21 and the casing 23 (which can also contact this rear metallising of the crystal near the edge of the latter).

The advantage of loading the crystal mechanically at the back in this way is two fold. In the first instance energy is abstracted from the pulsed crystal so that the vibration of the latter is more quickly damped, so reducing paralysis time. In the second instance, and this is also especially important when using the crystal to search for nearby echoes, the extra damping to some extent swamps any variations of contact between the crystal and the specimen under test and diminishes need for critical balance of network elements where these are used. The effect on the values of the network elements is mainly confined to Rm (described below) which it increases in value, i. e. the Q of the system is diminished.

In Figure 3 a head 31 (which may be constructed as in Figure 1 or 2) is shown associated in manner known per se with a wedge 32 of material which changes the mode of vibration. A suitable material is polymethyl methacrylate or the construction described in British patent specification No. 766,983 may be used. The head and wedge are held together in a casing 33 and the whole can be applied to the specimen to press the base of the wedge against it, by the same sort of means as would be used to press the transducer head directly against a specimen, e. g. a stiff arm and screw.

Figure 4 shows the combination with the combined transmitting and receiving transducer employing barium titanate of other elements constituting a bridge circuit in accordance with one form of the present invention. The transducer indicated at TR is connected to one end of the secondary of a transformer TW while to the other end of this secondary is connected a network which will be described more fully below and against which the transducer is balanced. The transducer and network constitute arms of the bridge circuit while an indicating or recording system connected to the mid point of the transformer secondary constitutes one of the diagonals of the bridge and an oscillator O1 connected to the primary of the transformer TW supplies pulses i. e., trains of waves of the operating frequency at intervals, to the bridge, i. e., in effect across the other diagonal. The indicating or recording system is here represented by a cathode ray tube CRT supplied through an amplifier A and provided with a time base TB, the latter being connected to a generator of suitable frequency not shown.

By means of the network the transducer is balanced as nearly as may be at the frequency of the oscillator O1. Thus when a pulse is transmitted through the transformer TW the input to and paralysis time of the amplifier A are held to a very low value. Since the input will not or need not be zero an indication or record of the input pulse of suitable amplitude can be obtained. During the receiving period, however, after the pulse has terminated, the energy input to the circuit is through the transducer that is through one of the arms of the bridge and under these conditions a substantial fraction of the electrical output from the transducer will flow through the diagonal in which the indicating or recording system is incorporated and a corresponding indication or record will be obtained.

The nature of the elements needed in the network to balance the transducer depends primarily on the characteristics of the transducer itself since the network must simulate the transducer to balance it. Figures 5 and 6 described below are equivalent circuits of the transducer when in use as a transmitter and as will be seen by reference to Figure 5 in which the same references are used as in Figure 4, it is possible as a minimum to use as principal elements a first capacitance $Ce$ (equivalent to the electrical or electrostatic capacitance of the transducer), and shunted by an acceptor circuit comprising a series combination of a capacitance $Cm$ and inductance $Lm$ (equivalent to the mechanical capacitance and inductance of the transducer), these three elements $Ce$, $Cm$ and $Lm$ simulating the main characteristics of the transducer, together with a resistance $Rm$ simulating the mechanical load presented by the specimen. Additionally corresponding with Figure 6 there may be fixed a resistance $Ri$ in series and $Re$ in shunt with $Ce$ simulating further characteristics of the transducer and since there is compliance between the transducer and the specimen due both to the usual film of liquid and the elasticity of irregularities in the surface of the specimen an additional capacitance $Cmc$ in parallel with the resistance $Rm$, but those skilled in the art will understand that the equivalent of this capacitance can be provided by an adjustment of the value of $Cm$.

The elements $Ce$, $Cm$, $Lm$, $Rm$, and, if used, $Cmc$ are variable to enable balancing of the bridge circuit to be effected under operating conditions. In the very minimum case in which only $Ce$, $Cm$, $Lm$ and $Rm$ are provided a balance sufficient for useful results can be achieved by adjusting $Ce$ to balance the electrostatic capacitance of the transducer and adjusting $Rm$ to balance the loss resistance of the acceptor circuit (together with the usual dielectric loss of the capacitance $Ce$) and the mechanical resistance of the specimen. But adjustment of the other elements enables a more accurate balance to be achived. Since the values of $Rm$ and $Cmc$ at which the bridge is balanced will depend on the quality of contact between the transducer and the specimen the adjustment which has to be made in $Rm$ and $Cmc$ (or $Cm$ if $Cmc$ is not provided) to achieve balance constitutes a measure of the contact quality.

For a transducer constructed as in Figures 1 or 2 and for operation at 2½ mc./sec. the main component of the balancing network is a variable condenser $Ce$ which should have a range from about 2500 pf. (picofarads) to about 3700 pf. The input terminals of the network are connected to the element $Ce$ through about ¾ ohm. Also in parallel with the input terminals of the network is a series combination of a variable capacitor, $Cm$, in series with a variable inductance $Lm$ and a variable resistor $Rm$; the latter may or may not be shunted by a variable condenser $Cmc$. In the absence of $Cmc$, the range of these controls may well be: $Cm$ 120 to 360 pf.; $Lm$ 10 to 36 $\mu$h; $Rm$ 20 to 180 $\omega$. If $Cmc$, with a range of about .0003 to .003 $\mu$f. be provided, the range of adjustment of $Rm$ can be considerably less than above and of $Cm$ rather less. The use of the condenser $Cmc$ has the advantage of enabling one adjustment (e. g. of $Cmc$) to be made when the surface conditions are changed with very little need for change to either $Rm$ or $Cm$ provided that the surface is not seriously irregular. Furthermore, the use of $Cmc$ permits a better balance to be obtained over a wider frequency range.

In adjusting the circuit a long pulse is preferably used and the variable elements are adjusted to reduce the tail of each pulse to the minimum so as to make the input signal and echo signal as seen on the cathode ray tube as free from overlap as possible; then in the actual testing the pulse length of the input is made as small as conveniently possible thereby reducing the risk of overlap and obscurity even if there should be an echo from a flaw quite near the surface on which the transducer is located.

The balancing network technique described with reference to Figure 4, is of major consequence for searching for flaws which are near the surface where it is necessary in common transmitter and receiver working to shorten the paralysis of the amplifier as far as possible. For long range search only a few or indeed none of the network elements need be readjusted in moving from site to site, except where it is desired to measure the index of response of the flaw accurately.

In operation it is often advantageous for improving band-width to shunt the crystal with an inductance $Lee$ of 1.5 microhenries (for 2½ mc./s. operation) and to shunt the combination with a fairly low resistance $Ree$ of the order of 40 ohms and similar matched elements would be applied to the network arm. Such elements are indicated in dotted lines in Figure 4 and their equivalents are also indicated in Figure 6. By suitable design of the balancing transformer TW either or both the inductances and the resistances may be provided as part of the transformer itself or of the input circuit.

Similar networks to Figure 4 can be made up for other frequencies and as it is of course preferable in general to increase the diameter of the transducer inversely as the frequency (for this will maintain the angle of divergence of the beam constant), in such a case scaling the network elements to the new frequency is effected merely by multiplying all elements (except $Rm$ and $Re$ which remain unchanged) by the ratio:

$$\frac{\text{old frequency}}{\text{new frequency}}$$

As above mentioned, the present invention enables the quality of contact between the transducer and specimen to be evaluated. It will be clear that, besides the advantages of barium titanate in yielding higher intensities and better discrimination on echoes, this ability to use a balancing network which will give a direct indication of the scattering conditions and thus enable the index of flaw magnitude to be computed is an additional very valuable feature. The mathematical basis of this evaluation is as follows:

Referring to Figure 5 which shows the simplest circuit of the transmitter, an input voltage of $$V_{t}e^{i\omega t}$$

at the $(Cm-Lm)$ resonance will give a radiation power $Wt$ of $$Wt = \tfrac{1}{2} V_t^2/Rm \qquad (1)$$

and, according to, for instance Morse ("Vibration and Sound," McGraw Hill, 1948, p. 328) the pressure $$P_{tr}e^{i\omega t}$$

at a distance $r$ on the axis (Fraunhofer Region) at high frequency is given by $$P_{tr} = -\pi i \nu \rho \mu_0 a^2 / r \qquad (2)$$

where $i$ is $\sqrt{-1}$, $\nu$ is frequency in cycles per second, $\rho$ is density, $\mu_0$ is source particle velocity, $a$ is radiator radius, and since $$Wt = \tfrac{\pi}{2}\rho c a^2 u_0^2 \qquad (3)$$

$$u_0^2 = \tfrac{1}{a}\sqrt{\tfrac{2\,Wt}{\pi\,\rho c}} \qquad (4)$$

where $c$ is the wave velocity in the medium. Therefore, if $\lambda$ is the wave length in the medium $$P_{tr} = \frac{-ia}{r\lambda}\sqrt{2Wt\rho c \cdot \pi}$$

$$= \frac{-ia}{r\lambda} V_t \sqrt{\frac{\pi\rho c}{Rm}} \qquad (5)$$

Now by the principle of reciprocity, a relationship exists between the pressure per unit feed current at $r$ due to the device as a transmitter and the sensitivity M as a microphone in volts (open circuit) per dyne, thus $$M = (2r\lambda P_{tr}/I_t \rho c) \times 10^{-7} \qquad (6)$$

where $I_t$ is the feed current to the piezo-electric device which is so related to $V_t$ (except for phase angle) that $$I_t = V_t\left(\sqrt{\frac{1}{Rm^2} + \omega^2 Ce^2}\right) \qquad (7)$$

Now consider a small flaw at a distance $r$ irradiated by the pressure field $P_{tr}$. Then it radiates back towards the source a wave which there has a pressure $P_r$ given by:

$$P_r = \frac{P_{tr}}{r}\cdot g(a_f,\lambda) \qquad (8)$$

where $g$ is a function of the flaw dimensions $a_f$, its shape and disposition and the wavelength $\lambda$ of the irradiating wave (for fluids the characteristics of this function are to be found in Morse (loc. cit., p. 354)).

This will then give rise to an open circuit voltage $V_r$ from (7) of $$V_r = P_r M = \frac{(P_{tr})^2}{r} g(a_f,\lambda)\cdot\frac{2r\lambda \times 10^{-7}}{\rho c V_t \sqrt{\left(\frac{1}{Rm^2}\right) + \omega^2 Ce^2}} \qquad (9)$$

and using (5):

$$\frac{V_r}{V_t} = \frac{2\pi a^2}{\lambda r^2}\cdot g(a_f,\lambda) \times 1/\sqrt{1+\omega^2 Rm^2 Ce^2} \qquad (10)$$

Since all these quantities except $g(a_f,\lambda)$ are known or can readily be measured, the value of $g(a_f,\lambda)$ can be obtained provided that $Rm$ and $Ce$ are measured.

In practice the equivalent circuit of the transducer is likely to be as in Figure 6, but since the additional elements are known or measurable, the computation of the flaw characteristic $g(a_f,\lambda)$ can still be carried out with admittedly rather more labour.

A further development is to balance the bridge circuit by the use of a servo-mechanism actuated by the signal, in a manner known per se.

Techniques exist and have been described in detail (for instance in the Radar Convention of the Institution of Electrical Engineers, 1946 and by me in Supplement No. 2 to Il Nuovo Cimento, 1950) whereby successive cycles of a fundamental recurrence frequency are used to permit various functions to be fulfilled without disturbance one of the other. Thus, in the present application of pulse devices and servo-mechanisms, only one of several successive cycles should be used to transmit energy for search in the specimen under test and the others which may be termed "adjustment cycles" are used to permit the servo-mechanism to receive suitable signals so as to set the values of the network elements to suit contact or specimen conditions for optimum results as regards minimum range.

Any convenient number of adjustment cycles may be used for each search cycle and in general the adjustment cycles may use long pulses and the search cycles short pulses. As will be explained below with reference to Figure 7 the first adjustment cycle may have a long pulse at a low frequency and during this cycle the principal adjustment would be applied to $Ce$, Figure 4, while in the second adjustment cycle a long pulse at a frequency close to the crystal resonance is used. In this cycle the principal adjustment would be of $Cmc$, $Rm$, being left set at an appropriate value found by experience to be correct for the type of material under test. However, more elaborate sequences can be used in which adjustments of $Lm$ and $Cm$ are effected.

It is to be noted that, in general, the length of the pulse during the test or search period would be short and during the adjustment cycles would be long. It is desirable that balancing should be effected at two different frequencies at least, when a servo-mechanism is used.

The need for rebalancing the bridge arises from unavoidable variations in operating conditions which cause variations in the compliance between the transducer and specimen thus varying the value of $Cmc$, which in turn causes variations in the mechanical impedance which affects the value of $Rm$ and in the "electrostatic" capacitance of the transducer which affects the value of $Ce$. The desirability of effecting balancing at different frequencies is due to the fact that in any A. C. bridge, balance requires both in phase and out of phase voltages to be simultaneously reduced to zero in the bridge diagonal. Such balance in general only holds in the immediate vicinity of the frequency used in the bridge. If suitable additional elements are used the frequency can be varied over a fair range without the bridge being seriously unbalanced. When a pulsed supply is used the signal has a fairly wide frequency spectrum and it is desirable therefore that balance should be reasonably accurate not only at the basic frequency but some way on each side and this is achieved by effecting the balancing operations at two different frequencies.

An example of a servo system which automatically balances the bridge while testing its proceeding is diagrammatically shown in Figure 7. This system operates by directing the function into a rapidly repeated sequence of three operations. In one operation (which may for convenience be called the first) the specimen is tested using a circuit closely analogous to that described above with reference to Figure 4. In the next (second) operation, the capacitance $Ce$ is adjusted, and in the third operation, the condenser $Cmc$ and the resistance $Rm$ are adjusted.

To isolate the testing and adjustment of the capacitance $Ce$, in the second operation both a signal derived by a phase-selecting circuit from the signal generator, but 90° out of phase with the generated signal and a signal derived from the bridge (but suitably "gated") are applied to a phase-sensitive rectifier-amplifier. If the capacitance $Ce$ is correctly adjusted, the two signals balance out, but if it is not, the two signals do not balance and the output of the rectifier-amplifier depends in value and sign on the out of balance and is used to adjust the capacitance $Ce$.

In the third operation, the capacitance $Cmc$ is adjusted in the same manner as the capacitance $Ce$ in the second operation. To test and adjust the resistance $Rm$ a similar principle is used, but in this case the derived signal fed to a phase-sensitive rectifier-amplifier must be in the phase with the signal fed to the transducer. Thus for this operation there must be two phase-selecting circuits one selecting at 90° to the signal fed to the transducer and one selecting in phase with the signal, and two rectifier-amplifiers. The former selecting circuit and the corresponding rectifier-amplifier are also used in the second operation.

During the first operation, the signals are sent to the transducer in short pulses, while during the second and third operations such longer pulses are used and a lower frequency is used for the second operation, but the normal frequency is used for the other operations; by normal frequency is meant the frequency of resonance of TR and of the network $Lm$, $Cm$. For these and other purposes, the system as a whole embodies other elements as will appear from the detailed description.

The system is operated by the aid of a constant speed electric motor M directly coupled to drums carrying contacts cooperating with brushes; merely for convenience two drums D1 and D2 are shown, the first of which coacts with four brushes $a \ldots d$ and the second with twelve brushes $e \ldots p$. Each revolution of the drums is divided into the three operations (or a multiple of three operations) and the motor may be a synchronous motor operated on a supply giving it, for example, a speed of 3,000 R. P. M.

An A. C. generator G, conveniently an electronic tube circuit, generates a suitable frequency, say 50 C. P. S., tripled to 150 C. P. S., which is fed both to a time base circuit TB the output of which is fed to a cathode ray tube CRT and to an amplifier $Am$ which supplies the motor M, and to the gating circuit G2 thus ensuring that the trace exhibited on the cathode ray tube and the rest of the system are synchronised.

An oscillator $O_1$ can generate oscillations at two frequencies, one say 2½ mc./s., for the first and third operations and the other a lower frequency, say 1 mc./s. for the second operation. The frequency of the oscillator is selected through the brushes $a$, $b$, i. e. when these brushes are connected the lower frequency is generated. The output of oscillator $O_1$ is fed inter alia both to the transducer TR and to the equivalent network via the balancing transformer TW through a combined gate and amplifier GA which is under the control of another circuit PL itself controlled through the brushes $c$, $d$ the pulses or wave trains which reach the transducer being shortened suitably for testing the specimen when the brushes $c$, $d$ are connected, and being lengthened when the brushes $c$, $d$ are not connected.

The bridge circuit associated with the transducer is analogous to that shown in Figure 4 and comprises the similarly marked variable elements $Ce$, $Cm$, $Lm$, $Cmc$ and $Rm$. The elements $Cm$ and $Lm$ may be pre-set to suit the characteristics of the transducer and therefore are not provided in this example with any form of automatic control. The other elements are provided with controls conveniently in the form of geared electric motors indicated by $mCe$, $mCmc$ and $mRm$ respectively; in addition the resistance $Rm$ will need to be provided with manual control by which it can be pre-set or adjusted to suit such major changes as change of the material under test, e. g. aluminium or steel, which call for different mean values of $Rm$.

The oscillator $O_1$ also supplies, through an amplifier OA, a phase splitter comprising two circuits $PS_1$ and $PS_2$, the outputs of which are respectively in phase and 90° out of phase with the output of the oscillator $O_1$. As the circuit $PS_2$ is sensitive to frequency, suitable correction is applied when the oscillator $O_1$ is generating its lower frequency; conveniently this is done through brushes $e$, $f$. Similar brushes could be used on $PS_1$ for reasons of economy in the design of the phase splitting circuits to avoid making them very wide band.

The outputs of the circuits $PS_1$ and $PS_2$ are led to respective phase-sensitive rectifier-amplifier circuits $PSRA_1$ and $PSRA_2$ and the brush $k$ also leads to them. Their outputs are led to respective brushes $j$ and $i$.

A transformer winding TW picks up an out-of-balance signal from the transducer TR and equivalent network and feeds it to an amplifier A1, the output of which leads to brush $g$. A gate circuit G2 is connected between the brushes $h$ and $l$, and another amplifier A2 has its input side connected to the brush $m$ and feeds its output to the cathode ray tube CRT. Other brushes not shown can be used to provide vertical displacement of the trace on the screen of the tube to different levels in the three operations if necessary so that it will be clear what is occurring.

Finally, with each of the motors $mCe$, $mCmc$ and $mRm$ is associated a circuit of suitably selected long time constant $tc1$, $tc2$, $tc3$ and an amplifier $Am1$, $Am2$, A*m*3, these three circuits being respectively connected to the brushes *n, o* and *p*; their function being to store a control voltage during connection of the brushes and to leave this operating the motors during the non-contact period of the brushes.

During each first specimen-testing operation the brushes *c—d* and *g—m* are respectively connected together, all others being disconnected. Accordingly the oscillator O1 is operating at its higher frequency, the gate and amplifier circuit GA due to the connection of *c—d* is admitting only short pulses to the transducer TR, while the signals picked up by the transformer winding are carried to the amplifier A1, brushes *g—m* and amplifier A2 to the cathode ray tube CRT.

During each second operation, the pairs of brushes *a—b, e—f, g—h, l—k* and *i—p* respectively are connected together. The connection of *a—b* causes the oscillator O1 to operate at its lower frequency, while *c—d* not being connected opens the gate GA so that longer pulses are admitted to the transducer circuit and connection of *e—f* ensures that the circuit PS2 selects the correct phase of the signal coming from the oscillator O1. Connection of *g—h* and *l—k* brings the gate circuit G2 into the path from amplifier A1 to the two phase-sensitive rectifier amplifiers PSRA1 and PSRA2 (of which only one latter is used in this phase) and ensures that the appropriate part of the long pulse output signal is gated, and the connection of *i—p* connects the output of PSRA2 to the control circuit associated with capacitance C*e* of the bridge circuit.

During each third operation the pairs of contacts *g—l, l—k, j—o* and *i—n* respectively are connected together. Thus as in the second operation, long pulses, but at the higher frequency are admitted to the transducer and equivalent network circuit and the gate circuit G2 is again in the path from amplifier A1 to the two phase-sensitive rectifier amplifiers PSRA1 and PSRA2. The connection of *j—o* connects the output of PSRA1 to the control circuit associated with R*m* and the connection of *i—n* connects the output of PSRA2 to the control circuit associated with *c*M*c*.

In general, complete adjustment of the elements C*e*, C*mc* and R*m* cannot be obtained in the corresponding phases of one revolution of the drums D1, D2, but these rotate at a high speed, and the associated circuits of suitable long time constant ensure continuity of operation and the bridge circuit will in general always be close to balance.

It should be mentioned that where advantage is taken of the ability of the transducer according to the invention to use a long flexible cable between the head and the rest of the circuit elements, it is desirable to include a similar cable in series with the balancing network or to add series/shunt elements which simulate this cable. It will also be understood that the transducer may be excited by any suitable valve circuit, that its output may be taken to any suitable valve amplifier the output of which is applied for example to a cathode-ray tube provided with a time base which enables the transmitted and received pulses to be discerned and the time interval between them and therefore the corresponding distances in the specimen to be measured.

What I claim is:

1. Apparatus for the testing of elastic materials for internal flaws comprising the combination of a piezoelectric transducer of barium titanate, means for applying the transducer to a specimen under controlled pressure conditions enabling ultrasonic vibrations to pass in both directions between the transducer and the specimen, a bridge circuit in one arm of which the transducer is connected and in the opposite arm of which is included a network of elements which substantially balance the transducer, said network comprising at least a first variable capacitance simulating the electrostatic capacitance of the transducer and a series combination shunting said first capacitance, said combination including at least a capacitance and an inductance simulating the mechanical capacitance and inductance of the transducer and a variable resistance simulating the mechanical load of the specimen, an amplifier and indicating system in one diagonal of the bridge circuit, and means for supplying the other diagonal of the bridge circuit with pulses of alternating current energy of an ultrasonic frequency appropriate to the transducer.

2. Apparatus as set forth in claim 1 wherein the capacitance and inductance in said series combination are also adjustable.

3. Apparatus as set forth in claim 1 wherein said network includes a resistance in parallel with the first capacitance which simulates the electrical capacitance of the transducer.

4. Apparatus as set forth in claim 1 wherein said network includes a variable capacitance simulating the compliance between the transducer and the load connected in parallel with the resistance simulating the load.

5. Apparatus as set forth in claim 1 wherein the transducer and the balancing arm are each provided with a shunt inductance and a shunt resistance.

6. Apparatus as set forth in claim 1 also including separate means for adjusting each of a plurality of elements of the network of the balancing arm actuatable by any out-of-balance of the bridge circuit to adjust the respective element towards balance, connections between the bridge circuit and said adjusting means, and switching means for making and breaking said connections in a rapidly repeated succession of cycles, each succession including one cycle in which the specimen is tested for faults and a series of cycles in which the said separate adjusting means are actuated in turn.

7. Apparatus as set forth in claim 1 also including separate servo-actuated means for adjusting at least the capacitance simulating the electrical capacitance of the transducer and separate servo-actuated means for adjusting the resistance simulating the load of the specimen, each of said separate means being actuatable by any out-of-balance of the bridge circuit, connections between the bridge circuit and said separate means, and switching means for making and breaking said connections in a rapidly repeated succession of cycles, each succession including one cycle in which the specimen is tested for faults and at least two cycles in which the said separate means are actuated to bring the respective elements of the bridge towards balance.

8. Apparatus as set forth in claim 7 also including a capacitance simulating compliance between the transducer and the load connected in parallel with the resistance simulating the load, and servo-means for adjusting said capacitance towards balance actuated simultaneously with the servo means for bringing said resistance towards balance.

9. Apparatus as set forth in claim 1 also including a backing on the transducer which gives it additional loading, said backing consisting of a moulded material incorporating a powdered heavy metal.

10. Apparatus as set forth in claim 9 also including a firm outer jacket holding said loading material and on to which pressure for transmission to the piezo-electric element can be applied.

11. Apparatus as set forth in claim 10 wherein said backing is of serrated form to produce an extended length of reflected path for energy before it returns to the piezoelectric element.

References Cited in the file of this patent

UNITED STATES PATENTS 2,280,226    Firestone _____ Apr. 21, 1942

(Other references on following page)

UNITED STATES PATENTS

| | | | |
|---|---|---|---|
| 2,283,285 | Pohlman | May 19, | 1942 |
| 2,398,701 | Firestone | Apr. 16, | 1946 |
| 2,424,030 | Hayes | July 15, | 1947 |
| 2,430,013 | Hansell | Nov. 4, | 1947 |
| 2,448,352 | Carlin | Aug. 31, | 1948 |
| 2,450,263 | Wise | Sept. 28, | 1948 |
| 2,486,146 | Frondel | Oct. 25, | 1949 |
| 2,486,560 | Gray | Nov. 1, | 1949 |
| 2,527,986 | Carlin | Oct. 31, | 1950 |
| 2,532,507 | Meunier | Dec. 5, | 1950 |
| 2,565,725 | Frederick et al. | Aug. 28, | 1951 |
| 2,602,102 | Webb | July 1, | 1952 |

FOREIGN PATENTS

| | | | |
|---|---|---|---|
| 639,651 | Great Britain | July 5, | 1950 |
| 997,046 | France | Sept. 5, | 1951 |